United States Patent
Scheer et al.

(10) Patent No.: US 12,384,289 B2
(45) Date of Patent: *Aug. 12, 2025

(54) CARGO RESTRAINT SYSTEM

(71) Applicant: Goodrich Corporation, Charlotte, NC (US)

(72) Inventors: Dustin Paul Scheer, Jamestown, ND (US); Aaron J Roberts, Jamestown, ND (US); Wesley K Stegmiller, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,827

(22) Filed: Apr. 16, 2024

(65) Prior Publication Data
US 2024/0278710 A1 Aug. 22, 2024

Related U.S. Application Data

(62) Division of application No. 17/179,775, filed on Feb. 19, 2021, now Pat. No. 11,987,165.

(60) Provisional application No. 63/025,007, filed on May 14, 2020.

(51) Int. Cl.
*B60P 7/08* (2006.01)
*B60P 7/13* (2006.01)
*B64D 9/00* (2006.01)

(52) U.S. Cl.
CPC ............. *B60P 7/132* (2013.01); *B60P 7/13* (2013.01); *B64D 9/003* (2013.01)

(58) Field of Classification Search
CPC .... B60P 7/132; B60P 7/13; B60P 7/08; B60P 7/0807; B60P 7/0892; B60P 7/135; B60P 7/18; B64D 9/003
USPC .......... 410/46, 71, 77–80, 82, 90–91, 94–95
See application file for complete search history.

(56) References Cited

U.S. PATENT DOCUMENTS

| | | | |
|---|---|---|---|
| 1,675,701 A | 7/1928 | Fitch | |
| 3,972,500 A | 8/1976 | Johnson et al. | |
| 5,957,640 A | 9/1999 | Schmieke et al. | |
| 6,012,885 A | 1/2000 | Taylor et al. | |
| 6,039,519 A | 3/2000 | Jones et al. | |
| 7,114,898 B2 | 10/2006 | Brewster | |
| 7,896,593 B2 | 3/2011 | Brewster | |
| 8,113,751 B2 | 2/2012 | Merz | |
| 8,936,419 B1 * | 1/2015 | Islam | B64D 9/003 410/80 |

(Continued)

OTHER PUBLICATIONS

USPTO; Notice of Allowance dated Jan. 22, 2024 in U.S. Appl. No. 17/179,775.

(Continued)

*Primary Examiner* — Stephen T Gordon
(74) *Attorney, Agent, or Firm* — SNELL & WILMER L.L.P.

(57) ABSTRACT

A cargo restraint system comprises a plurality of cargo restraint assemblies. Each cargo restraint assembly in the plurality of cargo restraint assemblies may be removably coupled to a cargo deck in various configurations. The plurality of cargo restraint assemblies may be reconfigurable based on a size of a plurality of unit load devices (ULDs) to be loaded and restrained. Each cargo restraint assembly may restrain four or fewer corners of respective ULDs simultaneously.

7 Claims, 9 Drawing Sheets

(56) References Cited

U.S. PATENT DOCUMENTS

| | | |
|---|---|---|
| 9,266,463 B2 | 2/2016 | Hindy |
| 11,987,165 B2 * | 5/2024 | Scheer ..................... B60P 7/13 |
| 2002/0076294 A1 | 6/2002 | Afful |
| 2010/0196116 A1 * | 8/2010 | Hudson ................. B64D 9/003 |
| | | 410/77 |

OTHER PUBLICATIONS

USPTO; Non-Final Office Action dated Aug. 17, 2023 in U.S. Appl. No. 17/179,775.
USPTO; Requirement for Restriction/Election dated Jul. 6, 2023 in U.S. Appl. No. 17/179,775.

\* cited by examiner

CARGO RESTRAINT SYSTEM

CROSS-REFERENCE TO RELATED APPLICATIONS

This application is a divisional of, claims priority to and the benefit of, U.S. application Ser. No. 17/179,775 filed Feb. 19, 2021, entitled "CARGO RESTRAINT SYSTEM" (hereinafter the '775 Application). The '775 Application claims priority to and the benefit of U.S. Provisional Application No. 63/025,007, filed May 14, 2020, entitled "CARGO RESTRAINT SYSTEM," (hereinafter the '007 Application). The '775 Application and the '007 Application, are hereby incorporated by reference in their entirety for all purposes.

FIELD

The present disclosure relates generally to cargo handling systems, and more specifically, to a restraint scheme for aircraft cargo handling systems.

BACKGROUND

Aircraft cargo handling systems transport, guide and restrain cargo within the cargo hold of an aircraft. Typical aircraft cargo handling systems use a combination of fixed or moveable guides or restraints to hold cargo pallets or containers (e.g., unit load devices, or ULDs) in place during flight. Most systems use fixed side guides along the outboard edges of the aircraft and/or retractable guides inboard to provide restraint in the Y (lateral) and Z (vertical) directions and retractable restraints that handle the X (longitudinal) and Z directions on the forward and aft edges of the ULDs. Other restraint schemes for other ULDs use fixed side guides with retractable restraints that extend into pockets on the sides of the ULDs to provide X, Y and Z restraint on one or both sides of the ULD and retractable guides along the other side to handle Y and Z restraint.

These typical restraint schemes are not as flexible as they could be in terms of ULD load configuration. These systems can usually accommodate cargo of different sizes in the longitudinal direction by either moving restraints (if the system allows for that) or erecting a different set of restraints, but they are usually not as flexible in the lateral direction because they have lanes of predefined width. Additional hardware (usually fixed to the aircraft) is necessary to accept cargo of a different width. This increases the weight and complexity of the system.

SUMMARY

A cargo restraint assembly is disclosed herein. The cargo restraint assembly may comprise: a center portion; a first longitudinal restraint extending outward from the center portion, the first longitudinal restraint extending vertically from a first proximal end to a first distal end; a first lateral restraint extending outward from the center portion, the first lateral restraint substantially perpendicular to the first longitudinal restraint, the first lateral restraint extending vertically from a second proximal end to a second distal end; a vertical restraint disposed at the first distal end of the first longitudinal restraint, the vertical restraint comprising a flange; a first shear pin disposed at a first outward end of the first longitudinal restraint, the first shear pin extending from the first proximal end away from the first distal end; and a second shear pin disposed at a second outward end of the first lateral restraint, the second shear pin extending from the second proximal end away from the second distal end.

In various embodiments, the cargo restraint assembly may further comprise a locking mechanism disposed through the center portion, the locking mechanism configured to couple the cargo restraint assembly to a fitting of a cargo handling system. The cargo restraint assembly may further comprise a second longitudinal restraint and a second lateral restraint. The second longitudinal restraint may extend outward from the center portion in a first opposite direction relative to the first longitudinal restraint, and the second lateral restraint may extend outward from the center portion in a second opposite direction relative to the second longitudinal restraint. The first longitudinal restraint, the second longitudinal restraint, the first lateral restraint, and the second lateral restraint may each comprise a recess disposed therein. The first longitudinal restraint, the second longitudinal restraint, the first lateral restraint, and the second lateral restraint may each comprise a sidewall. The sidewall of the first longitudinal restraint, the second longitudinal restraint, the first lateral restraint, and the second lateral restraint may form an "X" shape. The cargo restraint assembly may further comprise a tab rotating coupled to the center portion, the tab configured to lock the cargo restraint assembly to a fitting of a cargo handling system.

A cargo restraint system for use in a cargo handling system is disclosed herein. The cargo restraint system may comprise: a cargo deck; a plurality of fitting assemblies spaced about the cargo deck; a plurality of cargo restraint assemblies configured to removably couple to the plurality of fitting assemblies, each cargo restraint assembly in the plurality of cargo restraint assemblies configured to restrain at a corner of a unit load device (ULD).

In various embodiments, each cargo restraint assembly in the plurality of cargo restraint assemblies is configured to restrain four or fewer ULDs simultaneously. The plurality of fitting assemblies may be spaced to accommodate ULDs of various sizes. Each cargo restraint assembly in the plurality of cargo restraint assemblies may comprise a first longitudinal restraint, a first lateral restraint, a second longitudinal restraint, a second lateral restraint, and a vertical restraint, each restraint extending outward from a center portion. Each cargo restraint assembly in the plurality of cargo restraint assemblies may comprises a plurality of shear pins disposed at ends distal to the on the first longitudinal restraint, the first lateral restraint, the second longitudinal restraint, and the second lateral restraint, the plurality of shear pins configured to restrict horizontal motion of each cargo restraint assembly during use. Each fitting assembly in the plurality of fitting assemblies may comprise a plurality of apertures configured to receive the plurality of shear pins of a respective cargo restraint assembly in the plurality of cargo restraint assemblies. Each cargo restraint assembly in the plurality of cargo restraint assemblies may comprise a locking mechanism disposed through the center portion, the locking mechanism configured to coupled to a respective fitting assembly in the plurality of fitting assemblies. Each fitting assembly in the plurality of fitting assemblies may comprise a spring loaded guide configured to press each cargo restraint assembly against a respective fitting assembly and keep each cargo restraint assembly tight against the respective fitting assembly.

A method for using a cargo restraint system is disclosed herein. The method may comprise: arranging a plurality of restraint assemblies in a first configuration about a cargo deck to restrain a first plurality of Unit Load Devices (ULDs); decoupling the plurality of restraint assemblies from the cargo deck; and re-arranging the plurality of restraint assemblies in a second configuration about the cargo deck to restrain a second plurality of ULDs, the second configuration being different than the first configuration.

In various embodiments, the first plurality of ULDs are different sizes than the second plurality of ULDs. Each cargo restraint assembly in the plurality of cargo restraint assemblies may be configured to restraint a respective corner of four or fewer ULDs in the first plurality of ULDs simultaneously. Arranging the plurality of restraint assemblies in the first configuration may further comprise arranging the first plurality of ULDs in a grid pattern. Arranging the plurality of restraint assemblies in the first configuration may further comprise disposing the plurality of restraint assemblies at respective corners of the first plurality of ULDs.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION OF THE DRAWINGS

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Throughout the present disclosure, like reference numbers denote like elements. Accordingly, elements with like element numbering may be shown in the figures but may not necessarily be repeated herein for the sake of clarity.

As used herein, "aft" refers to the direction associated with the tail (i.e., the back end) of an aircraft, or generally, to the direction of exhaust of a gas turbine engine. As used herein, "forward" refers to the direction associated with the nose (i.e., the front end) of an aircraft, or generally, to the direction of flight or motion.

Cargo restraint systems, as disclosed herein, may comprise cargo restraint assemblies configured to guide and restrain the movement of ULDs or other cargo across the floor or "cargo deck" of an aircraft. In accordance with various embodiments, the cargo restraint assemblies may be coupled to a cargo deck and be configured to restrain a ULD in a longitudinal, lateral, and vertical direction. In this regard, the cargo restraint assembly may restrain a first cargo, a second cargo, a third cargo, and a fourth cargo, in accordance with various embodiments. The cargo restraint assembly may be disposed at a corner of the first cargo, the second cargo, the third cargo and the fourth cargo. The restraint assembly may be easily repositioned in the cargo handling system to accommodate different sizes of ULDs to be restrained in a grid, or the like. The cargo restraint assembly may be removably coupled to fittings disposed in the cargo deck and/or stored when not in use.

Figure 1:
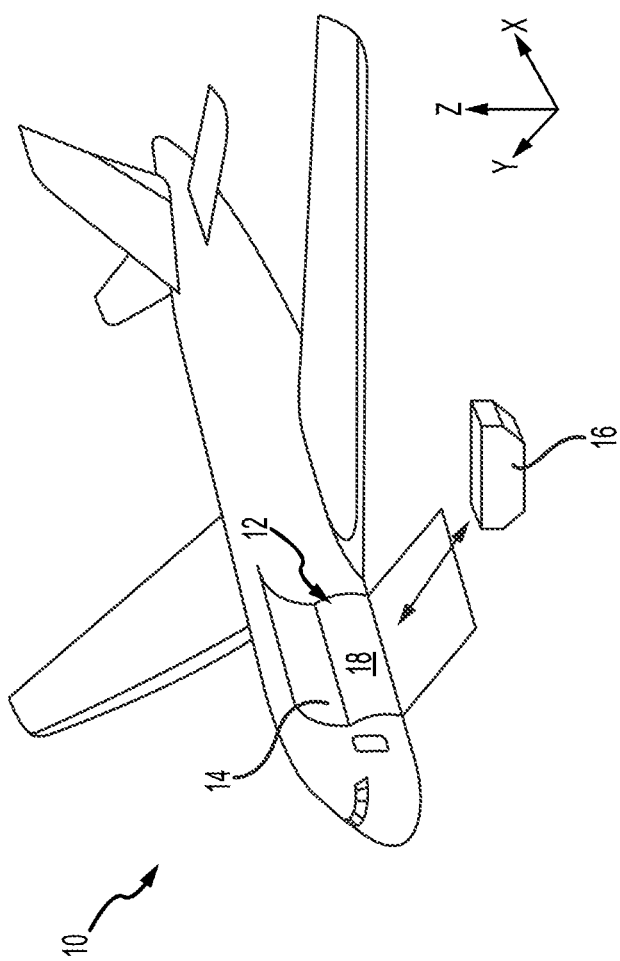
FIG. 1 illustrates an axonometric view of an aircraft being loaded with cargo, in accordance with various embodiments.

With reference to FIG. 1, an aircraft 10 is illustrated. Aircraft 10 includes a cargo compartment 12. A cargo door 14 provides access to cargo compartment 12 from outside aircraft 10. Cargo 16 (e.g., pallets or ULDs) may be loaded and unloaded through cargo door 14 and onto a cargo deck 18 of aircraft 10.

Figure 2:
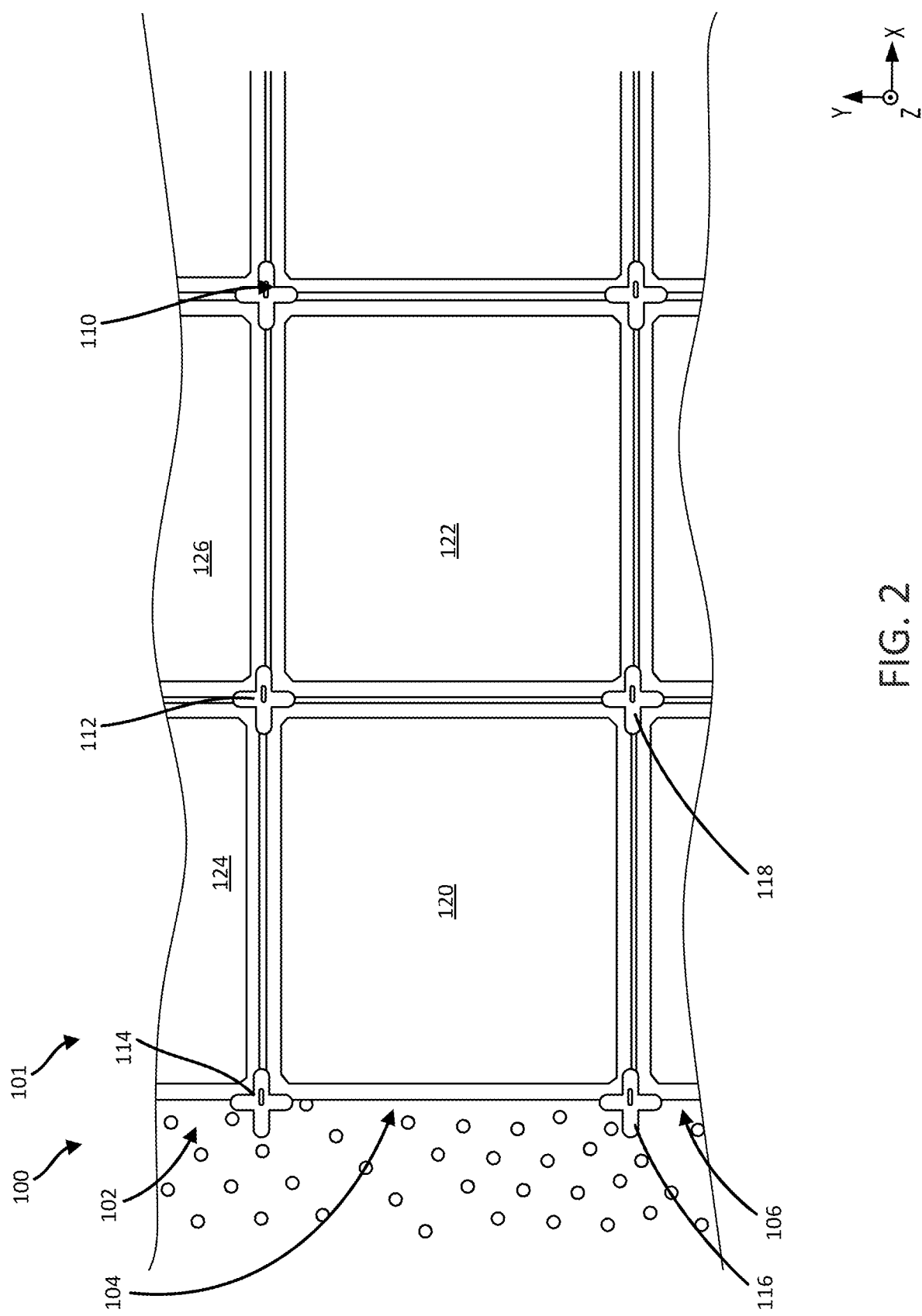
FIG. 2 illustrates a top down view of a ULD located on a cargo handling system, in accordance with various embodiments.

Referring now to FIG. 2, a top down view of a cargo restraint system 101 for a cargo handling system 100, in accordance with various embodiments, is illustrated. Cargo handling system 100 may be used to load, move, and unload cargo 16 from cargo deck 18. Cargo handling system 100 includes components configured to facilitate translation of cargo 16 along cargo deck 18. For example, cargo handling system a plurality of roller trays (caster trays), one or more rollers oriented in a longitudinal direction, one or more power drive units (PDUs) configured to propel cargo 16 in a desired direction, and/or one or more ball transfer units (BTUs) configured to translate cargo in a lateral and longitudinal direction. As used herein, the term "longitudinal" refers to forward and aft directions (i.e., a direction parallel to the X-axis on the provided X-Y-Z axes). As used herein, the term "lateral" refers to directions perpendicular to the longitudinal direction (i.e., directions parallel to the y-axis on the provided X-Y-Z axes). As used herein, the term "vertical" refers to directions perpendicular to cargo deck 18 (i.e., direction perpendicular to the X-Y plane and/or parallel to the Z-axis on the provided X-Y-Z axes).

In various embodiments, the cargo handling system 100 may include a first cargo row 102, a second cargo row 104, and a third cargo row. The first cargo row 102 may be disposed laterally adjacent to the second cargo row 104, and the third cargo row 106 may be disposed laterally adjacent to the second cargo row 104. Although illustrated as comprising three cargo rows, any number of cargo rows is within the scope of this disclosure.

In various embodiments, the cargo restraint system 101 may comprise a plurality of cargo restraint assemblies 110, as described further herein. In various embodiments, the cargo restraint system 101 is configured to restrain each of the four corners of a respective ULD. For example, the cargo restraint system 101 may comprise a first cargo restraint assembly 112 disposed at a first corner of a ULD 120, a second cargo restraint assembly 114 disposed at a second corner of the ULD 120, a third cargo restraint assembly 116 disposed at a third corner of the ULD 120, and a fourth cargo restraint assembly 118 disposed at a fourth corner of the ULD 120. In various embodiments, each cargo restraint assembly in the plurality of cargo restraint assemblies 110 may be configured to restrain up to four corners of four different ULDs simultaneously. For example, the first cargo restraint assembly 112 may be configured to restrain ULDs 120, 122 from the second cargo row 104 and ULDs 124, 126 from the first cargo row 102 simultaneously.

In various embodiments, each ULD comprises a flange extending outward from a main body of the ULD. For example, the first ULD 120 comprises a flange 121 extending outward around a perimeter of a main body 123 of the flange 121. In this regard, the flange 121 may interface with the restraint assemblies (e.g., restraint assemblies) 112, 114, 116, 118), in accordance with various embodiments.

Figure 3:
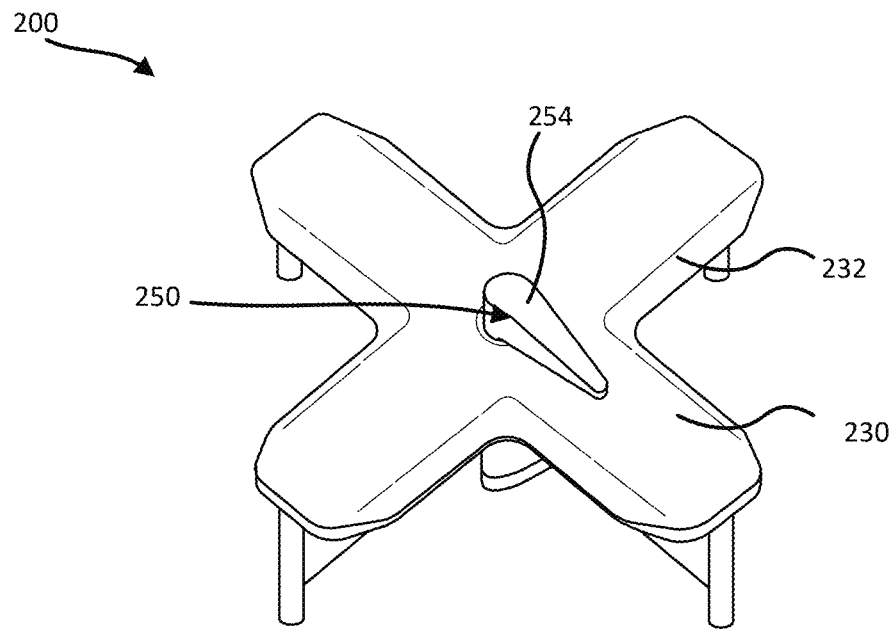
FIG. 3 illustrates perspective views of a cargo restraint assembly for a cargo restraint system, in accordance with various embodiments.
Figure 3:
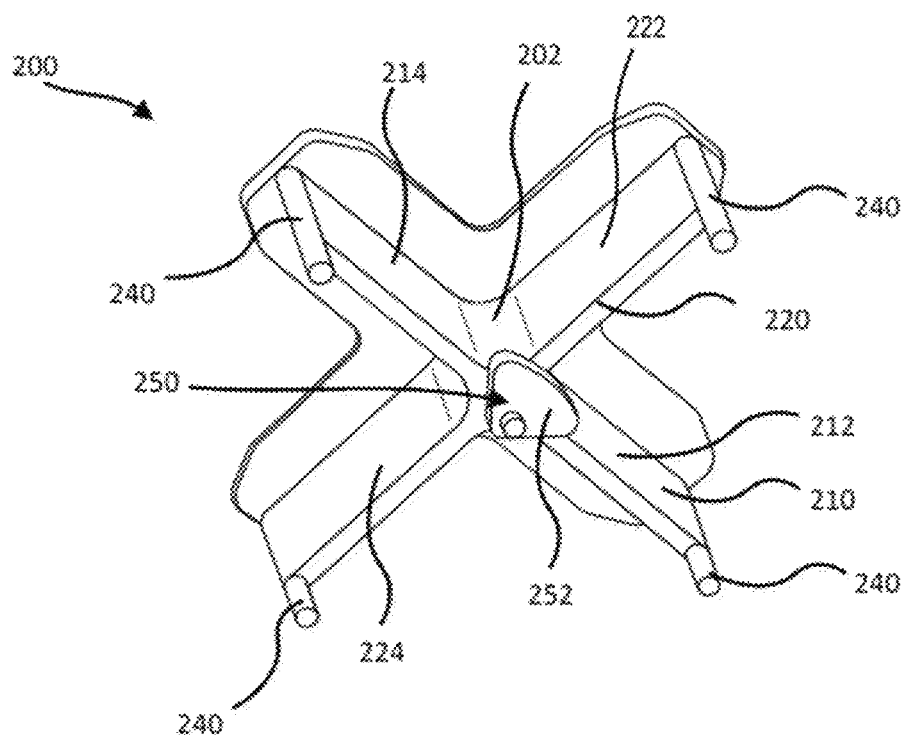

Referring now to FIG. 3, perspective views of a cargo restraint assembly 200 is illustrated, in accordance with various embodiments. In various embodiments, the plurality of cargo restraint assemblies 110 from FIG. 2 may be in accordance with the cargo restraint assembly 200. In various embodiments, the cargo restraint assembly 200 is configured to restrain at least one ULD from FIG. 2. As such, although disclosed herein as restraining four corners simultaneously, a restraint assembly configured to restrain only a single corner of only one ULD is within the scope of this disclosure. In various embodiments, the cargo restraint assembly comprises a first longitudinal restraint 210, a first lateral restraint 220, a vertical restraint 230, at least two shear pins 240, and a locking mechanism 250.

In various embodiments, the first longitudinal restraint 210 comprises a sidewall 212 extending vertically from a proximal end to a distal end. Similarly, the first lateral restraint 220 comprises a sidewall 222 extending vertically from a proximal end to a distal end. The sidewall 212 of the first longitudinal restraint 210 may be substantially perpendicular to the sidewall 222 of the first lateral restraint 220. "Substantially perpendicular," as disclosed herein is perpendicular +/−10 degrees. The sidewalls 212, 222 may extend outward from a center portion 202. In various embodiments, the first lateral restraint 220 is configured to restrain a respective ULD in a lateral direction when in use in a cargo restraint system (e.g., cargo restraint system 101 from FIG. 2). Similarly, the first longitudinal restraint 210 is configured to restrain a respective ULD in a longitudinal direction when in use in a cargo restraint system (e.g., cargo restraint system 101 from FIG. 2).

In various embodiments, the vertical restraint 230 is disposed at the distal end of the sidewall 212 of the first longitudinal restraint 210 and the distal end of the sidewall 222 of the first lateral restraint 220. In various embodiments, the vertical restraint 230 comprises a flange 232 extending horizontally from the distal end of the sidewalls 212, 222. In various embodiments, the flange 232 may form a complimentary shape to a corner of a ULD. In various embodiments, the vertical restraint 230 of the cargo restraint assembly 200 is configured to restrain a ULD in the vertical direction. For example, a ULD may comprise a tab that extends under the vertical restraint 230, when the cargo restraint system 101 from FIG. 2 is being utilized, and tab may be restrained in the vertical direction by the vertical restraint 230.

In various embodiments, the locking mechanism 250 may be operably coupled to the center portion 202. The locking mechanism 250 may be any mechanism configured to lock a cargo restraint assembly 200 to a cargo deck, a fitting for a cargo deck, or the like. Although illustrated herein as comprising a rotatable tab, any locking mechanism is within the scope of this disclosure. In various embodiments, the locking mechanism comprises a tab 252 disposed proximate the proximal ends of sidewalls 212, 222 and center portion 202. The tab 252 may be rotatably coupled to a handle 254 disposed proximate the vertical restraint 230. In this regard, the tab 252 may be configured to be disposed through a complimentary aperture in a fitting or a cargo deck and rotated to lock the restraint assembly 200 vertically in place.

In various embodiments, the cargo restraint assembly 200 may further comprise a second longitudinal restraint 214 and a second lateral restraint 224. The second longitudinal restraint 214 may extend outward from the center portion 202 in a direction opposite to the first lateral restraint 220. Similarly, the second lateral restraint 224 may extend outward from the center portion 202 in a direction opposite to the first lateral restraint 220. In various embodiments, the longitudinal restraints 210, 214 and the lateral restraints 220, 224 may form a substantially "X" shape. Each sidewall of the restraints 210, 214, 220, 224 may be substantially equidistant, in accordance with various embodiments. In various embodiments the sidewalls may have different distances and configured for a specific orientation if mistake proofing is desired. In various embodiments, by having the same distance, assembling the cargo restraint assembly 200 in a restraint system (e.g., cargo restraint system 101 from FIG. 2). The second longitudinal restraint 214 may be in accordance with the first longitudinal restraint 210 and the second lateral restraint 224 may be in accordance with the first lateral restraint 220.

In various embodiments, each sidewall of the restraints 210, 214, 220, 224 includes a shear pins 240 disposed distal to the center portion 202 of the cargo restraint assembly 200. The shear pin 240 for each sidewall of the restraints 210, 214, 220, 224 extends in a vertical direction away from proximal end in a downward direction away from the respective distal end for the respective sidewall. The shear pins 240 are configured to prevent horizontal translation of the (e.g., translation in the X-Y plane from FIG. 2), while the cargo restraint assembly 200 is in use.

Figure 4:
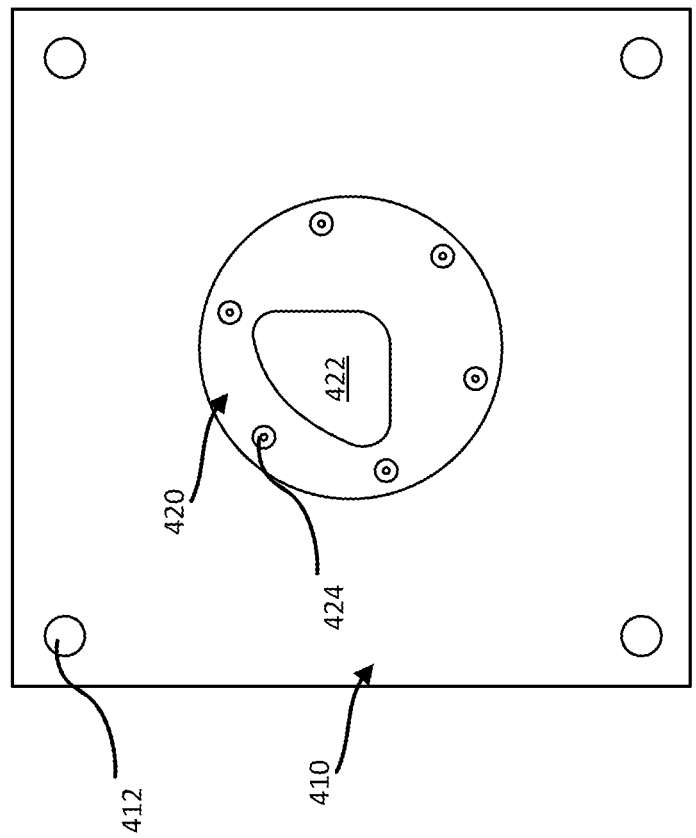
FIG. 4 illustrates a top down view of a fitting assembly for a cargo restraint system, in accordance with various embodiments.

Referring now to FIG. 4, a top down view of a fitting assembly 400, in accordance with various embodiments, is illustrated. The fitting assembly 400 may be attached to a cargo deck (e.g., cargo deck 18 from FIG. 1), or a separate component configured to be coupled to a cargo deck. In various embodiments, the fitting assembly 400 may comprise a main body 410 and a plate 420. The plate 420 may be removably coupled to the main body 410. In this regard, the plate 420 may be easily replaced if the plate 420 wears or becomes unusable after use, in accordance with various embodiments. In various embodiments, the plate 420 may be integral with the main body 410. In various embodiments, the main body comprises apertures 412 disposed in complimentary manner to shear pins 240 from the cargo restraint assembly 200. In this regard, apertures 412 are configured to receive shear pins 240 therein and prevent translation in a horizontal direction of a respective restraint assembly (e.g., cargo restraint assembly 200 from FIG. 3).

In various embodiments, the plate 420 comprises a tab aperture 422 complimentary in shape to the tab 252 of the locking mechanism 250 from FIG. 3. In this regard, the tab aperture 422 may be configured to receive a respective tab therethrough, and the tab may be rotated to lock the respective restraint assembly (e.g., cargo restraint assembly 200 from FIG. 3) in place. The plate 420 may be coupled to the main body by any method known in the art (e.g., fasteners 424 or the like).

Figure 5:
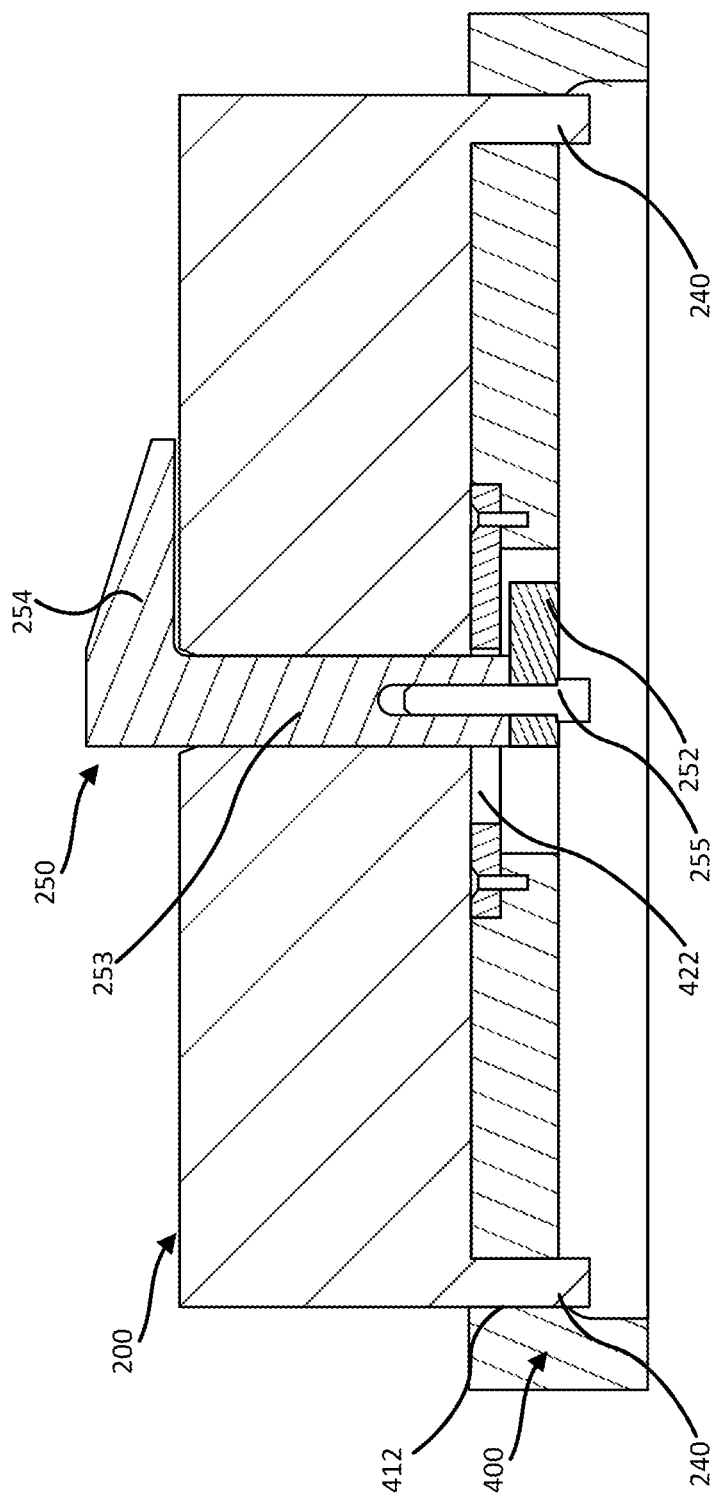
FIG. 5 illustrates a cross-sectional view of a cargo restraint assembly coupled to a fitting assembly, in accordance with various embodiments.

Referring now to FIG. 5, a cross sectional view of a cargo restraint assembly 200 coupled to a fitting assembly 400 is illustrated, in accordance with various embodiments. In various embodiments, the shear pins 240 are disposed within apertures 412 of the fitting assembly 400. Similarly, the tab 252 of the locking mechanism 250 is disposed through the tab aperture 422 and rotated to an opposite orientation of the tab aperture 422. In this regard, the tab 252 may prevent vertical translation of the cargo restraint assembly 200 when the cargo restraint assembly 200 is in use in a cargo restraint system (e.g., cargo restraint system 101 from FIG. 2).

In various embodiments, the locking mechanism 250 may further comprise a shaft extending vertically from the handle 254 through the center portion of the cargo restraint assembly 200 to the tab 252. In various embodiments, the tab 252 may be coupled to the shaft 253 by any method known in the art (e.g., a fastener 255, a weld, a braze, a press fit, or the like).

In various embodiments, the shear pins 240 may also transmit longitudinal and lateral shear loads through the fitting assembly 400 and into the aircraft structure. In various embodiments, the shear pins 240 may be sized and configured to engage apertures 412 prior to the tab 252 engaging the tab aperture 422. In this regard, proper alignment may be ensured and/or the restraint assembly may stay in place while the handle 254 is rotated to lock the cargo restraint assembly 200 in place.

Figure 6:
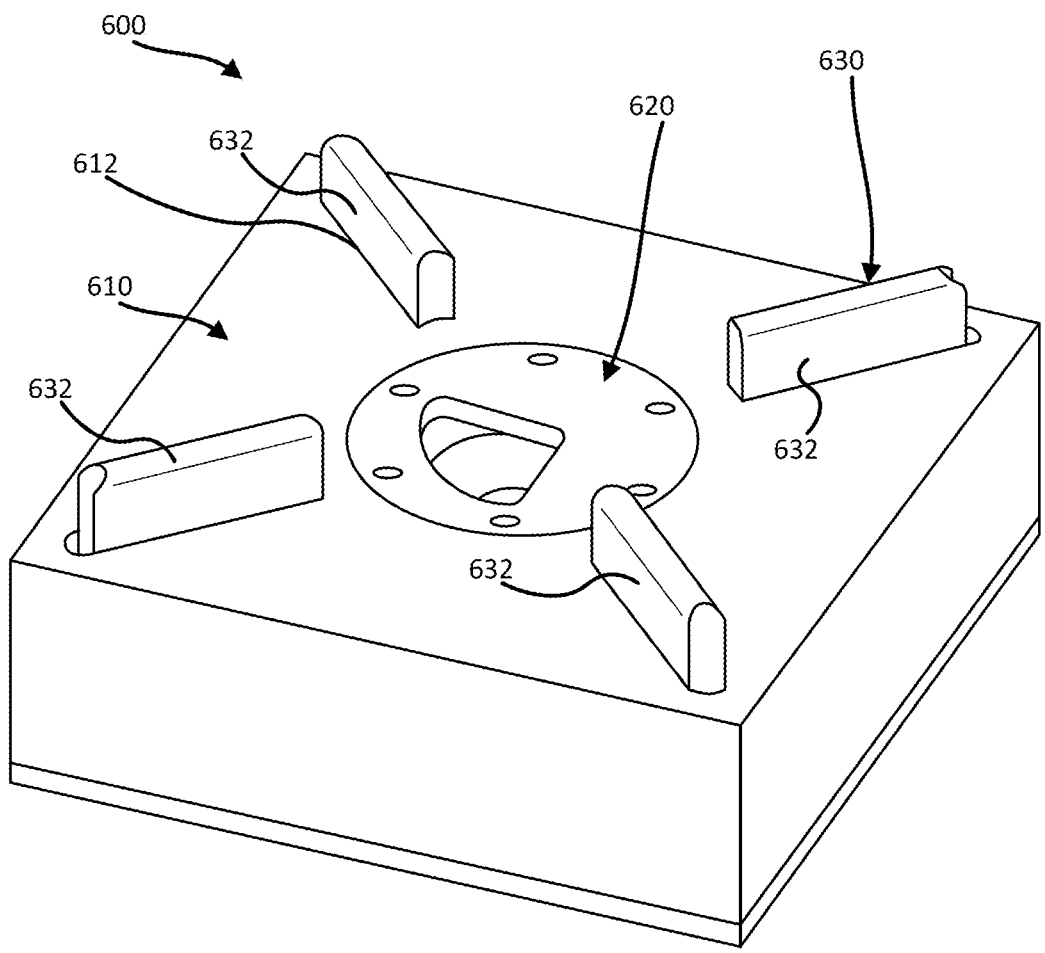
FIG. 6 illustrates a perspective view of a fitting assembly for a cargo restraint system, in accordance with various embodiments

Referring now to FIG. 6, a perspective view of a fitting assembly 600, in accordance with various embodiments, is illustrated. The fitting assembly 600 may include a main body 610 and a plate 620. The main body 610 may be in accordance with main body 610 with the addition of slots 612 extending from a radially inner end proximate the plate 620 radially outward. In various embodiments, the plate 620 may be in accordance with the plate 420 from FIG. 4.

In various embodiments, the fitting assembly 600 may further comprise a spring loaded guide 630. The spring loaded guide 630 may comprise protrusions 632 configured to extend through the slots 612. The protrusions 632 may be configured to receive respective sidewall from a lateral or longitudinal restraint of a respective restraint assembly. The respective sidewall may comprise a recess complementary in shape to the protrusions 632.

Figure 7:
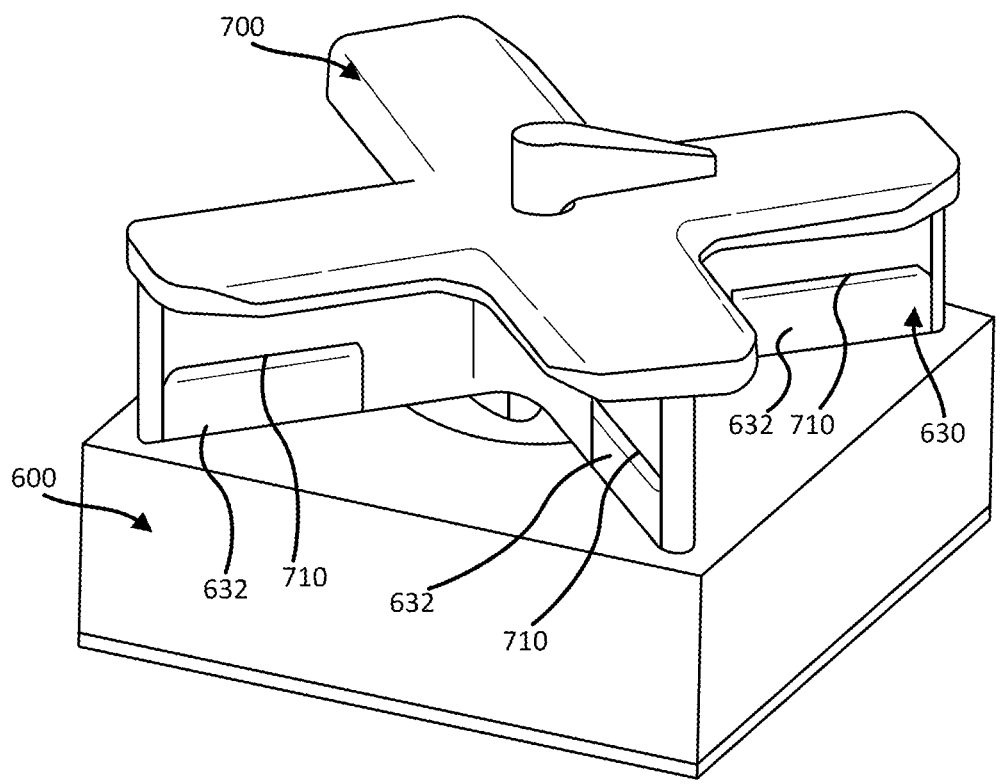
FIG. 7 illustrates a perspective view of a cargo restraint assembly coupled to a fitting assembly, in accordance with various embodiments.

Referring now to FIG. 7, a perspective view of a restraint assembly 700 coupled to a fitting assembly 600, in accordance with various embodiments. The restraint assembly 700 may be in accordance with cargo restraint assembly 200 and further comprise recesses 710 disposed in restraints 210, 214, 220, 224 from cargo restraint assembly 200 in FIG. 2. The recesses 710 may be complimentary in shape to the protrusions 632 of the spring loaded guide 630 of fitting assembly 600. In various embodiments, the spring loaded guide 630 is configured to hold a respective ULD in place while an operator is installing the restraint. In various embodiments, the spring loaded guide 630 may be pushed below the floor when a respective ULD is being loaded over the fitting assembly 600 or when the ULD is being restrained over the fitting assembly 600.

Figure 8:
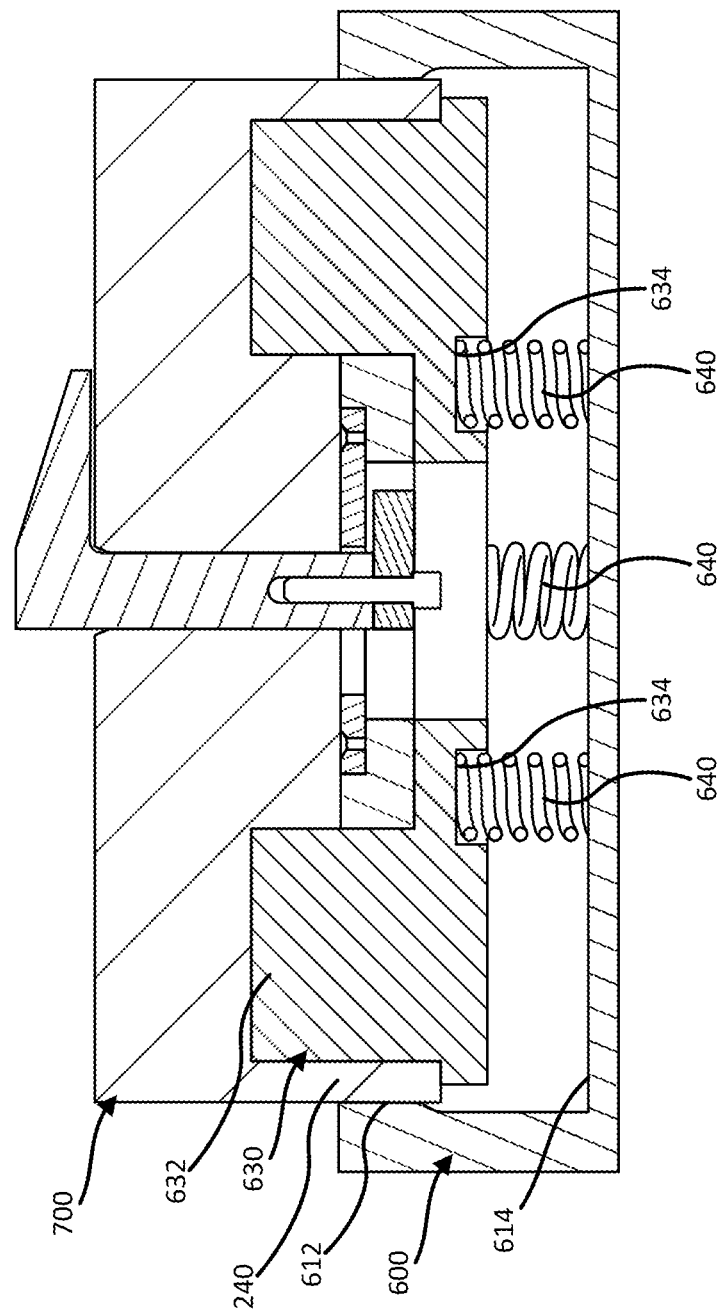
FIG. 8 illustrates a cross-sectional view of a cargo restraint assembly coupled to a fitting assembly, in accordance with various embodiments.

Referring now to FIG. 8, a cross-sectional view of the restraint assembly 700 coupled to the fitting assembly 600 is illustrated, in accordance with various embodiments. In various embodiments, the fitting assembly 600 may further comprise springs 640 disposed between a surface 614 of main body 610 and recesses 634 disposed in a body of the spring loaded guide 630. In various embodiments, the shear pins 240 of the restraint assembly 700 may be disposed between slots 612 of fitting assembly 600 and protrusions 632 of spring loaded guide 630. In this regard shear pins 240 may still prevent horizontal translation of the restraint assembly 700 during use of the restraint assembly 700 in a cargo restraint system (e.g., cargo restraint system 101 from FIG. 1).

Figure 9:
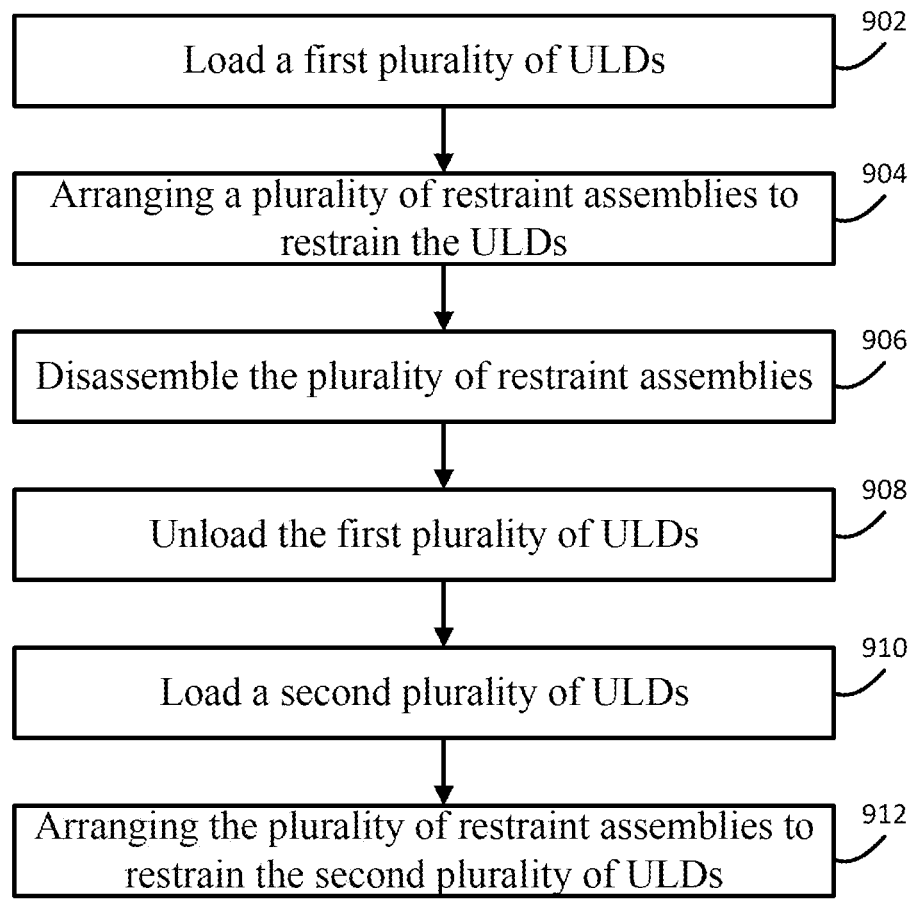
FIG. 9 illustrates a method of using a cargo restraint system, in accordance with various embodiments.

Referring now to FIG. 9, a method of using a cargo restraint system (e.g., cargo restraint system 101 from FIG. 1), is illustrated, in accordance with various embodiments. The method 900 comprises loading a first plurality of ULDs (step 902). The first plurality of ULDs may be loaded via a cargo handling system (e.g., cargo handling system 100 from FIG. 1). The first plurality of ULDs may be a first size.

The method 900 further comprises arranging a plurality of restraint assemblies to restrain the ULDs (step 904). The restraint assemblies may be assembled in accordance with the cargo restraint system 101 from FIG. 1 (e.g., arranged at corners of the ULDs and restraining between 1 and 4 corners simultaneously).

The method 900 further comprises disassembling the plurality of restraint assemblies (step 906) and unloading the first plurality of ULDs (step 908). The method further comprises loading a second plurality of ULDs (step 910). The second plurality of ULDs may comprise a second size. The second size may be a different size than the first size of the first plurality of ULDs. The method further comprises arranging the plurality of restraint assemblies to restrain the second plurality of ULDs (step 912). The restraint assemblies may be placed in different locations compared to the first plurality of ULDs.

In various embodiments, a restraint system as disclosed herein (e.g., cargo restraint system 101) may allow more flexibility in a ULD load configuration of a cargo handling system relative to typical cargo handling systems. The cargo deck may have fitting assemblies (e.g., fitting assembly 400 or fitting assembly 600) at regular intervals and configurable for ULDs of various sizes. In various embodiments, the cargo restraint assembly may save on system weight, complexity, and/or part count relative to typical cargo restraint assemblies. In this regard, in accordance with various embodiments, the restraints may be repositioned and used elsewhere in the compartment rather than having multiple sets of restraint assemblies fixed to the floor throughout the compartment to accommodate all different ULD sizes.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cargo restraint assembly, comprising:
    a center portion;
    a first longitudinal restraint extending outward from the center portion, the first longitudinal restraint extending vertically from a first proximal end to a first distal end;
    a first lateral restraint extending outward from the center portion, the first lateral restraint substantially perpendicular to the first longitudinal restraint, the first lateral restraint extending vertically from a second proximal end to a second distal end;
    a vertical restraint disposed at the first distal end of the first longitudinal restraint, the vertical restraint comprising a flange;
    a first shear pin disposed at a first outward end of the first longitudinal restraint, the first shear pin extending from the first proximal end away from the first distal end; and
    a second shear pin disposed at a second outward end of the first lateral restraint, the second shear pin extending from the second proximal end away from the second distal end.

2. The cargo restraint assembly of claim 1, further comprising a locking mechanism disposed through the center portion, the locking mechanism configured to couple the cargo restraint assembly to a fitting of a cargo handling system.

3. The cargo restraint assembly of claim 1, further comprising a second longitudinal restraint and a second lateral restraint.

4. The cargo restraint assembly of claim 3, wherein the second longitudinal restraint extends outward from the center portion in a first opposite direction relative to the first longitudinal restraint, and wherein the second lateral restraint extends outward from the center portion in a second opposite direction relative to the first lateral restraint.

5. The cargo restraint assembly of claim 4, wherein the first longitudinal restraint, the second longitudinal restraint, the first lateral restraint, and the second lateral restraint each comprise a recess disposed therein.

6. The cargo restraint assembly of claim 3, wherein the first longitudinal restraint, the second longitudinal restraint, the first lateral restraint, and the second lateral restraint each comprise a sidewall, wherein the sidewall of the first longitudinal restraint, the second longitudinal restraint, the first lateral restraint, and the second lateral restraint form an "X" shape.

7. The cargo restraint assembly of claim 1, further comprising a tab rotatably coupled to the center portion, the tab configured to lock the cargo restraint assembly to a fitting of a cargo handling system.

* * * * *